No Printed Specification Available
8540X
W. C. Kniffin,
Washing Machine,
Patented Dec. 17, 1834.
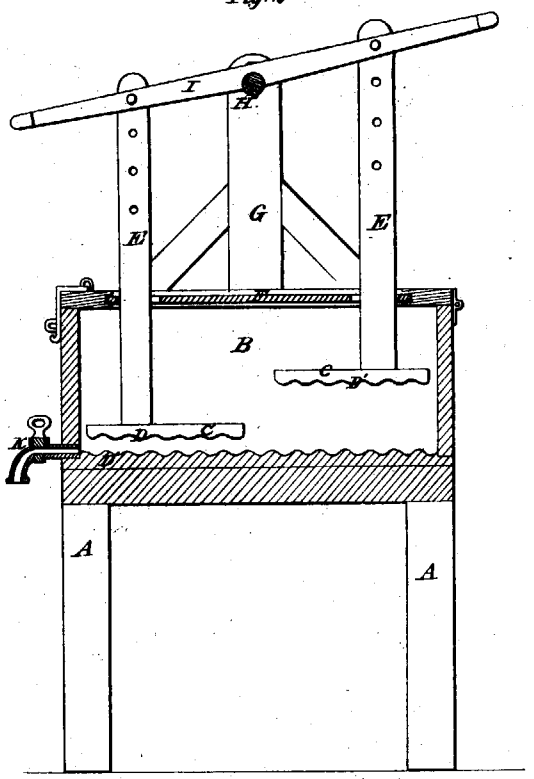
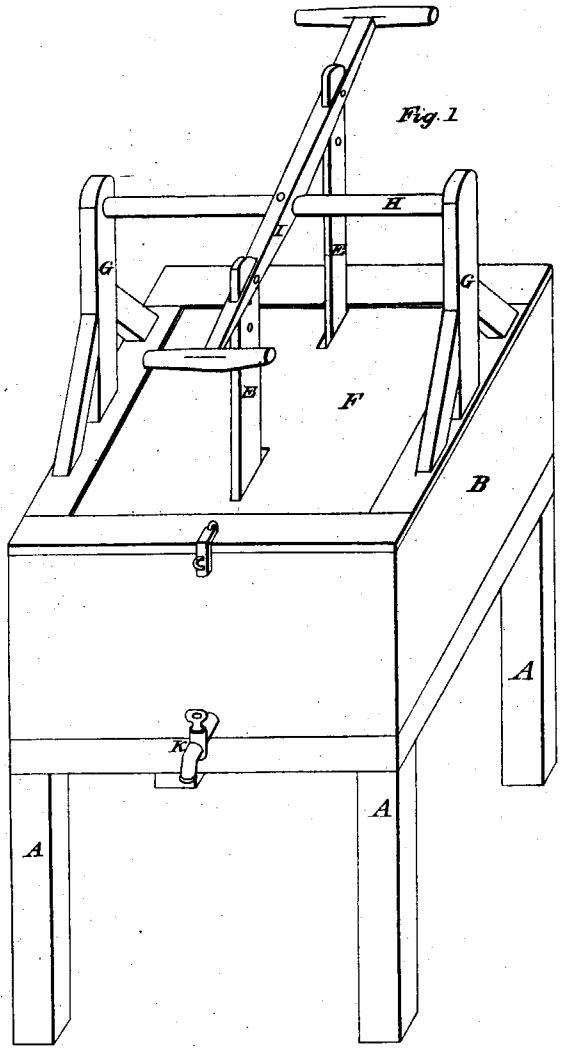
N. PETERS, PHOTO-LITHOGRAPHER, WASHINGTON, D. C.

William C. Kniffin Alexander, Genesee County, New York.

Letters Patent

The Schedule referred to in these Letters Patent and making part of the same contain-
ing a description in the words of the said William C. Kniffin himself of his improvement
in the application of Lever Power to a Machine for washing Clothes or Cloths.

To all to whom these presents shall come Be it known that I William C. Kniffin of
Alexander in the County of Genesee and State of New York have invented a
new and useful Improvement in the application of Lever Power to a machine for
washing Clothes or Cloths, and that the following is a full & exact description
of the construction & operation of said machine as invented by me.

The machine consists of a square frame 12 to 18 inches high & 18
to 24 inches square the posts of hard wood of not less than two inches diameter, and the
horizontal pieces to connect them of hard wood and sufficient size to render the frame
strong and durable. Upon the frame and firmly attached thereto a box made water
tight of plank not less than 1¼ inch thick of wood proper for such purpose 18 to 24
inches square and 10 to 12 inches deep the box and frame to be made of an equal
size. Two beaters of equal size of plank of not less than 1¼ inch thick of a size
to cover the bottom of the box inside to within half an inch on each side and allow-
ing the beaters to be one inch apart. Wooden bars to be attached across the beaters
The bars to be 1½ inches deep 1½ inches wide
there attached to the bottom of the beaters, and bevelled to half an inch wide on the
bottom calculated when the beaters are pressed down to fit closely between similar
bars fastened on the bottom of the box inside. Two upright shafts 18 to 24 inches
long 3/4 inches thick and two inches wide to be framed into each beater near the
end The cover to the box to be made of a pannel one inch thick surrounded with
a frame of hard wood composed of pieces 1½ to 2 inches square with mortices 3/4
inches wide and 9 inches long made to correspond with the position of the upright
shafts framed to the beaters and allowing said shafts to pass through. The cover to
be made to fit tight to the top of the box and to be attached thereto with substantial
hinges on one side and proper fastenings on the other side, to keep the same shut Dec 17 1834

140

[illegible]

Witnesses { Lewis Hall
Henry Hawkins }

William C. Griffin